United States Patent [19]

McCollum

[11] 4,136,848

[45] Jan. 30, 1979

[54] BRACKET

[76] Inventor: Robert H. McCollum, 2833 Merlin Ave., Fullerton, Calif. 92635

[21] Appl. No.: 766,128

[22] Filed: Feb. 7, 1977

[51] Int. Cl.² ............................................. A47F 5/00
[52] U.S. Cl. ........................... 248/316 R; 248/206 R; 248/362; 248/74 A
[58] Field of Search ........... 248/316 R, 316 C, 316 D, 248/206 R, 74 A, 362, 363; 211/65, 66; 24/73 UA, 257

[56] References Cited

U.S. PATENT DOCUMENTS

| 1,751,463 | 3/1930 | Backus et al. | 248/206 R |
|---|---|---|---|
| 1,906,874 | 5/1933 | Platt | 248/316 D |
| 2,516,311 | 7/1950 | Ganz | 248/316 D |
| 2,663,530 | 12/1953 | Nye | 248/206 R |
| 2,795,834 | 6/1957 | Szoke | 248/316 D |
| 2,961,479 | 11/1960 | Bertling | 248/316 D |
| 3,809,799 | 5/1974 | Taylor | 248/316 D |
| 3,827,152 | 8/1974 | Dailey | 211/69 |

Primary Examiner—Robert A. Hafer
Attorney, Agent, or Firm—Louis J. Bachand

[57] ABSTRACT

A unitary elastomeric bracket structure is provided for supporting a fishing rod or the like on a planar mounting surface. The bracket structure comprises a base and a pair of arms defining a partly enclosed bracket cavity, the structure having a single central locus of securement to the mounting surface whereby the structure tends to pivot about its securement locus. The invention provides the improvement comprising base bottom wall means defining a recess centered on the securement locus and peripherally co-planar with the base. The recess-defining base bottom wall means is flexibly responsive in surface sealing relation against pivoting of the structure about its securement locus.

12 Claims, 6 Drawing Figures

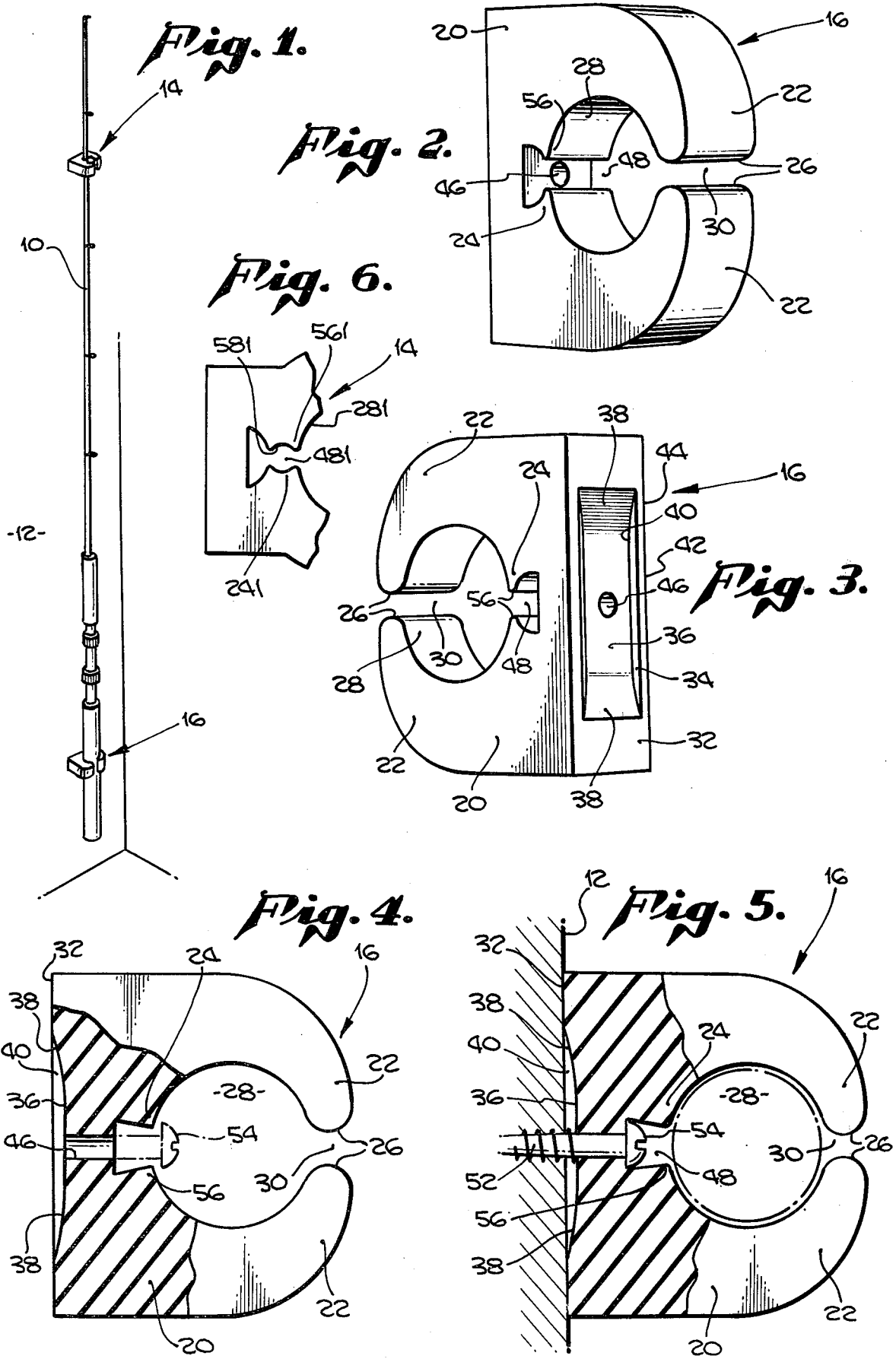

BRACKET

BACKGROUND OF THE INVENTION

This invention has to do with bracket structures, and more particularly with bracket structures formed of elastomeric materials which are useful for supporting rod-like objects, primarily fishing rods and the like, but including also pool cues, shotgun barrels, and like devices used in sport and play which need to be stored from time to time against damage and suitably in a display manner.

The invention will be particularly described with respect to a fishing rod bracket application of the present structure as illustrative of the utility of the device. Fishing rod brackets of one kind and another are known. Typically these brackets comprise protective supports for fishing rods and are sized in a manner to accommodate the butt end and the tip of the fishing rod in spaced relation against a wall, ceiling or deck structure. These brackets have solved a long continuing problem for fishermen, who after use of their poles need to store them until the next outing. Failure to properly stow fishing rods results in their breakage, as camping equipment and the like is placed against them, sometimes roughly. For this purpose fishing rod brackets have been devised which mount to the ceiling of a station wagon, to the cabin walls or decks of boats, and to room walls at home. These brackets are preferably fashioned of natural or synthetic rubber or like elastomeric material which may be molded or otherwise formed to provide an enclosing cavity to receive the butt and/or tip end of the fishing rod supported on a base, the base being affixed dto the wall, deck, ceiling or other planar surface.

A popular type of fishing rod bracket, typically used in pairs, comprises a base member having opposed upstanding arms which define a bracket cavity in which the rod is supported. A single cavity bracket may be secured to the mounting surface by pairs of e.g. screw fasteners inserted outboard of the cavity proper or may be secured by a single central e.g. screw fastener which enters the bracket base at the bottom of the rod-receiving cavity. There are some esthetic advantages to the concealment of the screw fastener, and for this purpose a single central mounting of the bracket in a manner to be concealed by the rod received in the cavity is preferred.

Problems, however, arise in the maintaining of the appropriate orientation of single central mounted brackets, since these brackets so mounted tend to rotate about their locus of securement defined by the screw fastener, becoming cocked, disoriented, and in need of reorientation each time a rod is inserted therein. The problem is increased by the very smooth, planar and in some instances highly polished surface to which the brackets are affixed. For example, on a boat the mounting surface may well be highly varnished or otherwise polished. The conventional planar bottom wall of a bracket base, fabricated of hard rubber or the like, tends to slip upon these polished mounting surfaces resulting in the disorientation problem noted.

PRIOR ART

The problem of arresting disorientation of brackets has been addressed in a number of patents, sometimes directly, sometimes by inference. See for example U.S. Pat. No. 1,906,874 to Platt and U.S. Pat. No. 2,795,834 wherein spring metal brackets are center mounted in a manner to protect against unwanted rotation of the bracket as mounted. Other patents known to applicant in the general area of brackets include U.S. Pat. No. 2,809,004 to Kaufman et al., U.S. Pat. No. 3,154,281 to Frank, U.S. Pat. No. 3,228,640 to Wolsh, and U.S. Design Patent No. 225,706 to the present applicant.

The aforementioned prior art brackets fall into two basic categories: those having plural outboard fasteners, i.e. not centrally mounted, and those centrally mounted and having provision against undue rotation which may mar wood or other mounting surface in an undesirable manner by gouging the same in anchoring the bracket to the mounting surface.

SUMMARY OF THE INVENTION

It is accordingly an object of the present invention to provide a new and improved bracket structure useful for mounting fishing poles and like rod objects. It is a further object of the present invention to provide in such bracket structure means to secure the bracket against unwanted rotation when mounted, which means do not mar, gouge or otherwise harm the mounting surface. It is a still further object to provide a unitary elastomeric fishing rod bracket which is mountable by single screw fastener to a planar mounting surface and which will not rotate about such mounting screw. It is a still further object of the invention to provide such a bracket structure wherein utilization of the bracket, as by inserting and removing the fishing rod, serves to increase the bracket's grip on the mounting surface. It is yet another object of the invention to provide in a bracket structure for mounting fishing rods and the like a vacuum seal generating recess such that a vacuum seal of the bracket base to the mounting surface is effected and increased by use of the bracket during the course of removal and insertion of fishing rods, by flexing of the bracket cavity-defining arms and the recess-defining wall means thereby.

More particularly, the invention provides in a unitary elastomeric bracket structure for supporting a fishing rod or the like on a planar mounting surface, comprising a base and a pair of arms defining a partly enclosed bracket cavity, the structure having a single central locus of securement to the mounting surface and tending to pivot about such locus, the improvement comprising base bottom wall means defining a securement locus centered recess peripherally co-planar with the base and flexibly responsive in surface sealing relation against pivoting of the structure about the securement locus. Typically the structure base is rectangular in cross-section and the base bottom wall means defines a base-congruent recess therein. A fastener mounting hole is provided centrally through the base defining the securement locus and the structure arms are arcuately opposed and adapted to flex locally oppositely in rod-receiving relation. Generally, the bracket arms converge to a junction at the base, the base typically being notched at the junction in securement fastener receiving and sheltering relation; the bracket cavity being suitably stepped to define different radius openings to embraceably receive the butt or tip end of the fishing rod.

In a particularly preferred embodiment of the invention, the bracket structure includes arms which cooperatively interact with the base bottom wall means to vary the dimensions of the recess in vacuum seal generating relation responsive to arm-deflecting reception of a rod in the cavity. In this preferred embodiment, the structure base again typically is rectangular in horizontal cross-section, the base bottom wall means defining a congruent recess in the base for flexing response to the arm movement and inwardly of the plane of the base bottom. Further, there is provided centrally through the base a fastener mounting hole arranged to receive a fastener in downwardly flexing relation against the base bottom wall means in recess-reducing relation. In a highly preferred embodiment, the bracket structure arms arc oppositely upward from opposed ends of the base top wall to define the bracket cavity and a circumferential gap therein dimensioned to rod receivingly deflect, in interacting relation with the base bottom wall means, to suction generatingly vary the dimensions of the recess, cooperatively responsive to reception of a rod in the cavity, and against slippage of the bracket about the mounting fastener. The base top wall may be notched opposite the gap in arm deflection facilitating relation and circumferentially of the mounting fastener location in received rod-protection relation from fastener contact. The rod butt receiving cavity may be stepped at the top base wall notch to define rod tip detenting shoulders above the fastener.

The bracket structure typically comprises natural or synthetic rubber adapted to flexibly engage the mounting surface and adapted to translate bracket arm movement to the base bottom wall in recess dimension varying relation. Such natural or synthetic rubber material may have a hardness of between 65 and 70 Durometer A.

BRIEF DESCRIPTION OF THE DRAWINGS

The invention will be further described as to an illustrative embodiment in conjunction with the attached drawings, wherein:

FIG. 1 is a perspective view of the invention bracket supporting a fishing rod vertically;

FIG. 2 is a top perspective view of the bracket structure accordint to the invention;

FIG. 3 is a bottom perspective view thereof;

FIG. 4 is a front elevation view, partly in section to show the recess therein;

FIG. 5 is a view like FIG. 4 with the bracket arms flexed from their FIG. 4 position; and FIG. 6 is a fragmentary view of an alternate form of the bracket.

DESCRIPTION OF THE PREFERRED EMBODIMENTS

With reference now to the drawings in detail, in FIG. 1 fishing pole 10 is supported vertically along wall 12 by bracket 16 at the rod lower or butt end and by bracket 14 at the rod upper or tip end. Wall 12 is representative of smooth, planar mounting surfaces to which bracket structure 14, 16 may be affixed. Such mounting surfaces are often decoratively treated and marring thereof is to be avoided, if possible.

The present invention bracket structure 16 is directed to filling the need for effective bracketing of e.g. fishing poles without undue marring of mounting surfaces and with optimum orientation retention at the mounting location, although only a single, central screw fastener is used.

In accordance with the invention, the bracket structure is provided with a suction or sealing assist recess in the base in a manner to be self-reinforcing securable to the mounting surface. Thus, and with reference to FIGS. 2 and 3, bracket structure 16 is shown to comprise a base 20 of generally rectangular cross-section in a plane parallel to the mounting surface (generally a horizontal plane), a pair of arms 22 extending upwardly from the base top wall 24 in an oppositely arced manner as shown to rounded terminals 26 defining a rod-receiving cavity 28 having circumferential gap 30 at the perimeter thereof. The base bottom wall 32 is dished at 34 to define a shallow recess 36 also generally rectangular in (normally horizontal) cross-section to be congruent with the base and provided with gently sloping end walls 38 merging into the base bottom wall and more sharply sloping side walls 40 which intersect the base bottom wall at the edge margin thereof, having a narrow, relatively flexible septum 44 suited to perimetrical sealing engagement with a planar surface upon pressing of the base bottom wall thereto as by a screw fastener inserted in hole 46 formed centrally of the rod receiving cavity 28 and of the recess 36 as well; the recess and cavity are coaxial and opposite facing about the locus of securement of the bracket defined by the screw fastener receiving hole 46.

The base top wall 24 is notched in the region 48 at the lower juncture of the arms 22 coaxially above the hole 46 for purposes to appear.

Having described the physical appearance of the bracket structure 16, and bearing in mind that the structure comprises an elastomer e.g. natural or synthetic rubber of a suitable hardness e.g. 65 to 70 Durometer A. it will be evident that the presence of recess 36 and the relatively more flexible side wall sections 44 on either longitudinal side thereof enable the recess to be peripherally coplanar with the mounting surface to which it is attached and to flexibly respond in surface sealing relation therewith and that such sealing blocks pivoting of the bracket structure 16 about its fastener.

A further feature of the present bracket structure is the generation and regeneration of the surface sealing by vacuum suction produced by the initial and subsequent flexings of the bracket structure arms 22, which flexings vary the dimensions of the recess 36, drawing air therefrom through the peripheral seal and blocking of air return by such seal, thus providing a vacuum or suction seal effect, which effectively limits rotation of the bracket.

With particular reference to FIGS. 4 and 5, the flexure of the bracket structure 16 is depicted in a somewhat exaggerated and schematic way. As shown screw fastener 52 passes through hole 46 into the mounting surface, e.g. wall 12. The slotted screw head 54 is shrouded by the shoulders 56 formed by notching the base top wall 24 as earlier described. In this manner the screw head 54 is recessed and protected from scratching the fishing rod or the like held in bracket cavity 28. As the screw fastener 52 is tightened down, the recess 36 is flattened down to a corresponding degree. This drives air from the recess 36 and forces the bracket base bottom wall 32 hard against wall 12, the recess 36 then being peripherally coplanar with the wall 12 surface, and sufficiently resilient for the purpose, effects a seal perimetrically of the recess. On insertion and removal of a fishing rod the arms 22 are locally deflected from this position (cf. FIG. 5) and beyond their normal position (cf. FIG. 4), resulting in a re-enlarging of the recess 36 dimensions as the arm terminals are displaced laterally, causing the base center portion surrounding the screw 52 to raise up. Upon release of this action, as when the rod is wholly in or wholly out of the cavity 28, the recess returns to the dimensions of FIG. 5, the perimetrical seal having been reinforced by the arm flexure and bracket body response.

Bracket 14 provides all the features and functions of bracket 16 but additionally provides a stepped rod receiving cavity 281 so as to firmly embrace either the butt end of the rod in the manner of bracket 16 in FIG. 1, or the thin tip end as shown at 14 in FIG. 1. For this purpose the base top wall 241 is notched at region 481 to provide opposed relatively elongated shoulders 561 which are oppositely concave to define detent structure 581 into which the rod tip end is snugly receivable.

I claim:

1. In a unitary elastomeric bracket structure for supporting a fishing rod or the like on a planar mounting surface, comprising a base and a pair of arms defining a partly enclosed bracket cavity, said structure having a single central locus of securement to said mounting surface and tending to pivot about said locus, the improvement comprising base bottom wall means defining a securement locus centered recess peripherally co-planar with the base said arms cooperatively interacting with said base bottom wall means to resiliently vary the dimensions of said recess in vacuum seal generating relation responsive to arm deflecting reception of a rod in said cavity, whereby said wall means is flexibly responsive in surface sealing relation against pivoting of said structure about its securement locus.

2. Bracket structure according to claim 1 in which said structure base is rectangular in horizontal cross-section, said base bottom wall means defining a base congruent recess therein.

3. Bracket structure according to claim 1 in which there is provided a fastener mounting hole centrally through said base defining the securement locus.

4. Bracket structure according to claim 1 in which said arms are arcuately opposed and adapted to flex locally oppositely in rod-receiving relation.

5. Bracket structure according to claim 1 in which said arms converge to a junction at the base and in which said base is notched at said junction in securement fastener receiving and sheltering relation.

6. Bracket structure according to claim 1 in which said cavity is stepped to embraceably receive the butt end or the tip end of said fishing rod.

7. Bracket structure according to claim 1 in which said structure comprises rubber adapted to translate bracket arm movement to said base bottom wall in recess dimension varying relation and having a hardness of 65 to 70 Durometer A.

8. Bracket structure according to claim 7 in which said structure base is rectangular in horizontal cross-section, said base bottom wall means defining a congruent recess in said base for flexing response to said arm movement and inwardly of the plane of the base bottom.

9. Bracket structure according to claim 8 in which there is provided centrally through said base a fastener mounting hole arranged to receive a fastener in downwardly flexing relation against said base bottom wall means in recess reducing relation.

10. Bracket structure according to claim 9 in which said arms arc oppositely upward from opposed ends of the base top wall to define said cavity and a circumferential gap therein dimensioned to rod receivingly deflect in interacting relation with the base bottom wall means to suction generatingly vary the dimensions of said recess cooperatively responsive to reception of a rod in said cavity and against slippage of said bracket about said mounting fastener.

11. Bracket according to claim 10 in which said base top wall is notched opposite said gap in arm deflection facilitating relation and circumferentially of the mounting fastener location in received rod protecting relation from fastener contact.

12. Bracket according to claim 11 in which said cavity is stepped at said notch to define rod detenting shoulders above said fastener.

* * * * *

UNITED STATES PATENT OFFICE
CERTIFICATE OF CORRECTION

Patent No. 4,136,848          Dated January 30, 1979

Inventor(s) Robert H. McCollum

It is certified that error appears in the above-identified patent and that said Letters Patent are hereby corrected as shown below:

The term of this patent subsequent to July 4, 1992 has been disclaimed.

Signed and Sealed this

First Day of May 1979

[SEAL]

Attest:

RUTH C. MASON
Attesting Officer

DONALD W. BANNER
Commissioner of Patents and Trademarks